Dec. 6, 1955  L. W. NELSON  2,725,756
V-BELT CLUTCH ASSEMBLY
Filed Oct. 18, 1954
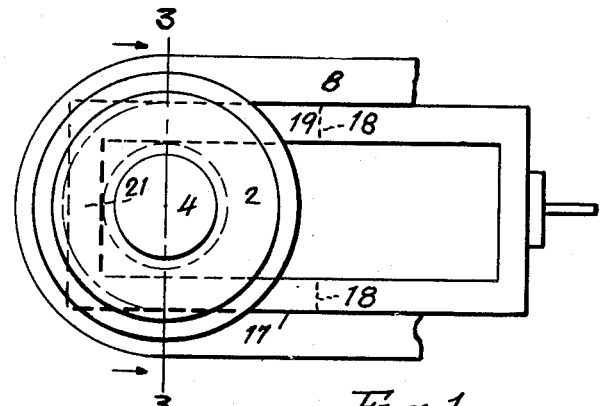
Fig. 1.
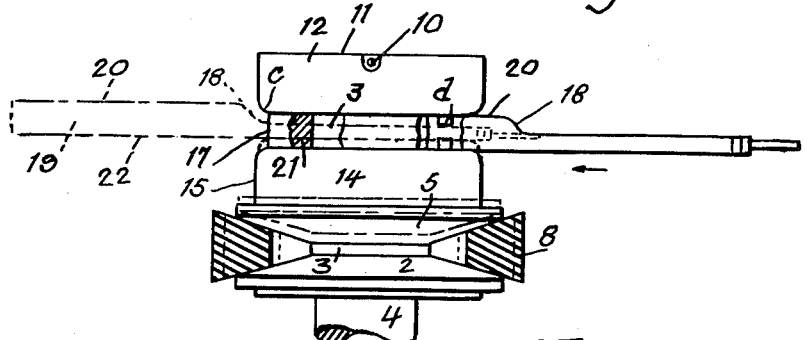
Fig. 2.
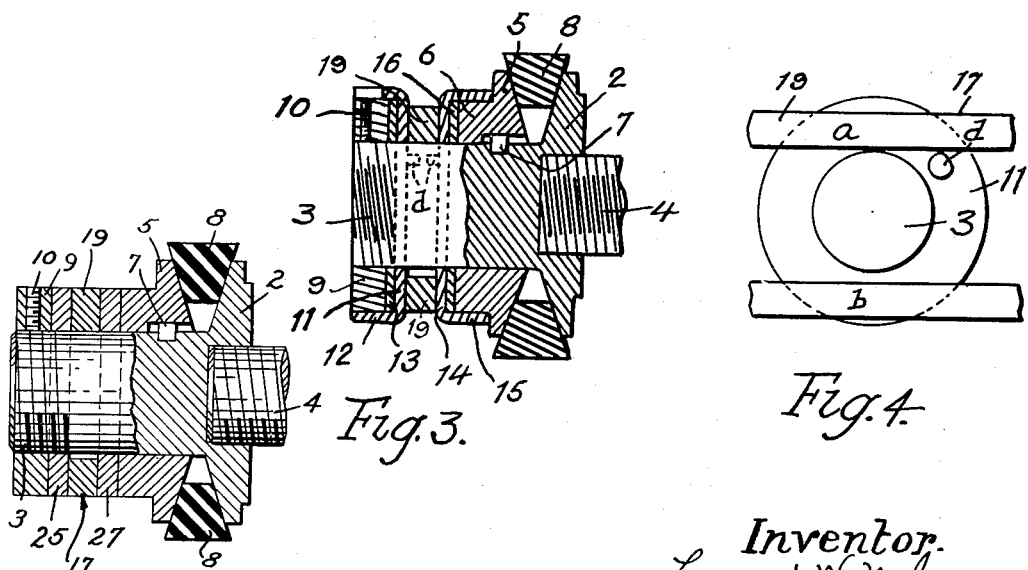
Fig. 3.
Fig. 4.
Fig. 5.
Inventor.
Leonard W. Nelson
BY Burton & Parker
ATTORNEYS

2,725,756
V-BELT CLUTCH ASSEMBLY

Leonard W. Nelson, Cottam, Ontario, Canada

Application October 18, 1954, Serial No. 462,944

2 Claims. (Cl. 74—230.24)

This invention relates to an improved V-belt clutch assembly.

One object of the invention is to provide a simple, inexpensive V-belt clutch assembly which is particularly designed for small machines such as power lawn mowers or the like.

Another object is to provide such a V-belt clutch assembly which is simple and inexpensive and which is readily adaptable to installation upon machines with which it is to be used, as, for example, power lawn mowers.

A further object is the provision of a V-belt clutch assembly which is of simple, sturdy construction, positive in action, and which is easily operable by one using the machine.

More particularly, an object is to provide a V-belt clutch assembly which includes: a V-belt pulley which pulley comprises two complementary sections, one of which is fixed to a shaft and the other of which is splined to the shaft for axial movement thereover toward and away from the first section and which define between them a V-shaped groove within which a V-belt rides; and simple control mechanism operable to shift the movable pulley section toward the fixed pulley section to pick up the V-belt for driving or to permit its reverse movement of the shiftable pulley section to release the belt. This control mechanism comprises a pair of bearings slidably mounted on the shaft for relative axial movement toward and away from the shiftable pulley section and which bearings have disposed between them the cam yoke end of a control rod which rod is supported for movement transversely over the shaft between the bearings. The two arms of the yoke portion of the rod are complementary and parallel and at one end the arms are of greater thickness than at the opposite end. When said one end of the yoke is positioned between the bearing assemblies, such assemblies are shifted relatively apart to move one pulley section toward the other pulley section. When the opposite end of the yoke is positioned between the bearing assemblies, such assemblies are permitted to move toward each other and the movable pulley section is permitted to move away from the fixed pulley section.

Other objects, advantages, and important features will further appear from the specification, claims, and accompanying drawing, wherein:

Fig. 1 is an end elevation of the assembly showing a V-belt mounted thereon and broken away;

Fig. 2 is a plan view of the assembly showing the V-belt in section.

Fig. 3 is a section on the line 3—3, Fig. 1.

Fig. 4 is a side elevation of one of the anti-friction members showing means to limit the rotation thereof.

Fig. 5 is a sectional view similar to Fig. 4 but showing a modified type of bearing assembly.

Pulley sections 2 and 5 are mounted on stub shaft 3 to rotate therewith. Pulley section 2 is fixed to the stub shaft. Pulley section 5 is splined to the stub shaft by key 7 to rotate with the shaft and for axial slidable movement over the shaft. Stub shaft 3 is coupled to shaft 4 to receive power therefrom. Pulley section 5 is provided with a hub which exhibits a keyway within which the key 7 is disposed.

The opposing faces of the pulley sections are complementary and together form a V-shaped rim for the pulley. In this rim operates the V-belt 8. A collar or nut 9 is threaded on the outer end of the stub shaft 3, and is locked in adjusted position thereon by a set screw 10.

Mounted on the stub shaft 3 are two spaced bearing assemblies. Each assembly comprises a cup-shaped bearing member within which is housed an anti-friction means. Cup-shaped bearing member 11 is provided with a flange 12 which overhangs collar 9 and surrounds an anti-friction disc or washer 13 interposed between the collar and the bottom of the cup-shaped member. Cup-shaped member 14 has a flange 15 which overhangs the hub 6 of the pulley section 5, and between the hub 6 and said member 14 is any suitable anti-friction means, in this case shown as a metal disc or washer 16.

Mounted on the stub shaft 4 between the bearing members 11 and 14 is a bifurcated or yoke-shaped open frame of a cam rod 17. The arms *a* and *b* of this yoke frame are in parallel relationship and complementary. The upper arm rests on the stub shaft 3. The other arm is located spaced below this shaft, thus eliminating friction between these parts, namely, the lower arm and the shaft. The elimination of friction in the interior of this device is important.

Complementary, parallel portions of the two arms for a length thereof somewhat longer than the diameter of the disc-like members 11 and 14, are uniformly thicker than the remaining linear portions of the arms and where the thicker portion of each arm adjoins the remaining portion there is formed a rounded shoulder 18. The portions of increased thickness of the arms are at the outer end of the yoke. The portions of reduced thickness of the arms are at the inner end of the yoke.

The elements of the device are shown in solid line in the drawings with the thicker portions 19 of the cam rod arms closely in contact with the disc-like members 11 and 14, and hence the bearing assemblies are spread apart and the pulley section 5 moved toward the pulley section 2 and is exerting its maximum pressure laterally against the V-belt 8, with the result that both pulley sections have the maximum frictional contact with said belt.

When the cam rod yoke is moved in the direction of the arrow shown in Fig. 2 to place the shoulder 18 beyond the disc-like member 11, and to the position shown in dot and dash line in such figure, the pressure of the V-belt will move the pulley section 5, the disc 16, and the bearing member 14 longitudinally on the stub shaft 3 so that the belt falls into the position shown by broken lines in Fig. 2. When the belt assumes the dotted line position shown in Fig. 2, its frictional contact with the pulley sections is reduced to such a degree that the belt will slip on the pulley sections and the clutch will be disengaged. To again engage the clutch the cam rod 17 is moved to the right and as the rounded shoulders 18 engage the rounded corner of the flange 12, the thicker portions 19 of said cam rod will engage the bearing members 11 and 14 and move the member 14 to cause it to move the pulley section 5 closer to the pulley section 2, thus increasing the frictional contact with the belt and engaging the clutch.

To prevent the disc-like members 11 and 14 from revolving freely around the stub shaft 3, each one is provided with a lug *d*. These lugs are positioned between the arms of the yoke and engage therewith for the purpose of limiting rotation.

The two sides 20 and 22 of the arms of the yoke of the cam rod are parallel to each other and are complementary. They perform the function of cams when they are used to engage and disengage the clutch. They have sliding contact with said flanged bearing members when moved to increase the distance between these flanged members.

The end bar 21 of the yoke will abut the stub shaft 3 when the clutch is fully engaged, and such end bar co-operating with the arms of the yoke hold the bearing members apart and parallel. As shown in Fig. 3, the enlarged or thicker portions 19 of the arms of the yoke contact the flanged members 11 and 14 below as well as above the stub shaft, thus ensuring that the pressure against the pulley section 5 will be evenly distributed.

In Fig. 5 a modified form of structure is shown wherein the cup-shaped bearing members are eliminated. The cam rod 17 embraces the stub shaft 3 between bearing discs 25 and 27 which discs are formed of suitable hardened self-lubricating, wear-resisting material and take the thrust directly of the cam rod and impart it directly to the hub of the shiftable pulley section. The construction otherwise is as shown in Fig. 3. The stub shaft is indicated as 3. Integral therewith is one pulley section 2. Splined thereon to rotate therewith but capable of shiftable movement thereover is the complementary pulley section 5. Upon the outer end of the shaft is secured the nut 9 held by a set screw 10. The cam rod is of course supported in a suitable manner upon the machine for fore and aft shiftable movement to bring one end or the other of the yoke portion between the bearing discs.

What I claim is:

1. A clutch assembly comprising, in combination, a stub shaft having a pulley section fixed thereon, a complementary pulley section splined on the shaft and slidable thereover toward and away from the pulley section fixed on the shaft, the opposing faces of said pulley sections together forming a V-shaped rim for the pulley, a V-belt disposed upon the rim between said pulley sections, the slidable pulley section provided with a hub, a pair of bearing assemblies mounted on the shaft in spaced relation adjacent to the hub of the slidable pulley section and shiftable axially over the shaft toward and away from each other and toward and away from the hub, a nut adjustably threaded on the shaft to vary the spacing of said assemblies, that bearing assembly immediately adjacent to the hub comprising a cup-shaped member embracing the hub and a bearing disc within the cup adjacent to the end of the hub, that bearing assembly remote from the hub comprising a cup-shaped bearing embracing the nut and a bearing disc within the cup adjacent to the nut, a cam rod having a yoke portion embracing the shaft between said bearing assemblies, said yoke having the linear portion of its arms adjacent to one end of the yoke parallel and complementary and of a greater dimension axially of the shaft than the linear portion of its arms adjacent to the opposite end of the yoke, said cam rod yoke shiftable transversely of the shaft between said bearing assemblies to move each of said linear portions of its arms between said bearing assemblies.

2. A clutch assembly as defined in claim numbered 1 characterized in that lugs are provided on the cup-shaped bearing assemblies between the arms of the yoke to limit the rotation of the bearing assemblies on the shaft while permitting limited rotation of each bearing assembly about the shaft.

References Cited in the file of this patent

UNITED STATES PATENTS

| | | |
|---|---|---|
| 652,541 | Gourgoulin et al. | June 26, 1900 |
| 1,455,587 | Hamilton | May 15, 1923 |
| 2,634,620 | Firth | Apr. 14, 1953 |
| 2,702,484 | Arata | Feb. 22, 1955 |